Sept. 3, 1929.   C. O. WESCOTT   1,726,969
BUN AND FINGER ROLL MOLDING MACHINE
Filed March 29, 1928   2 Sheets-Sheet 1
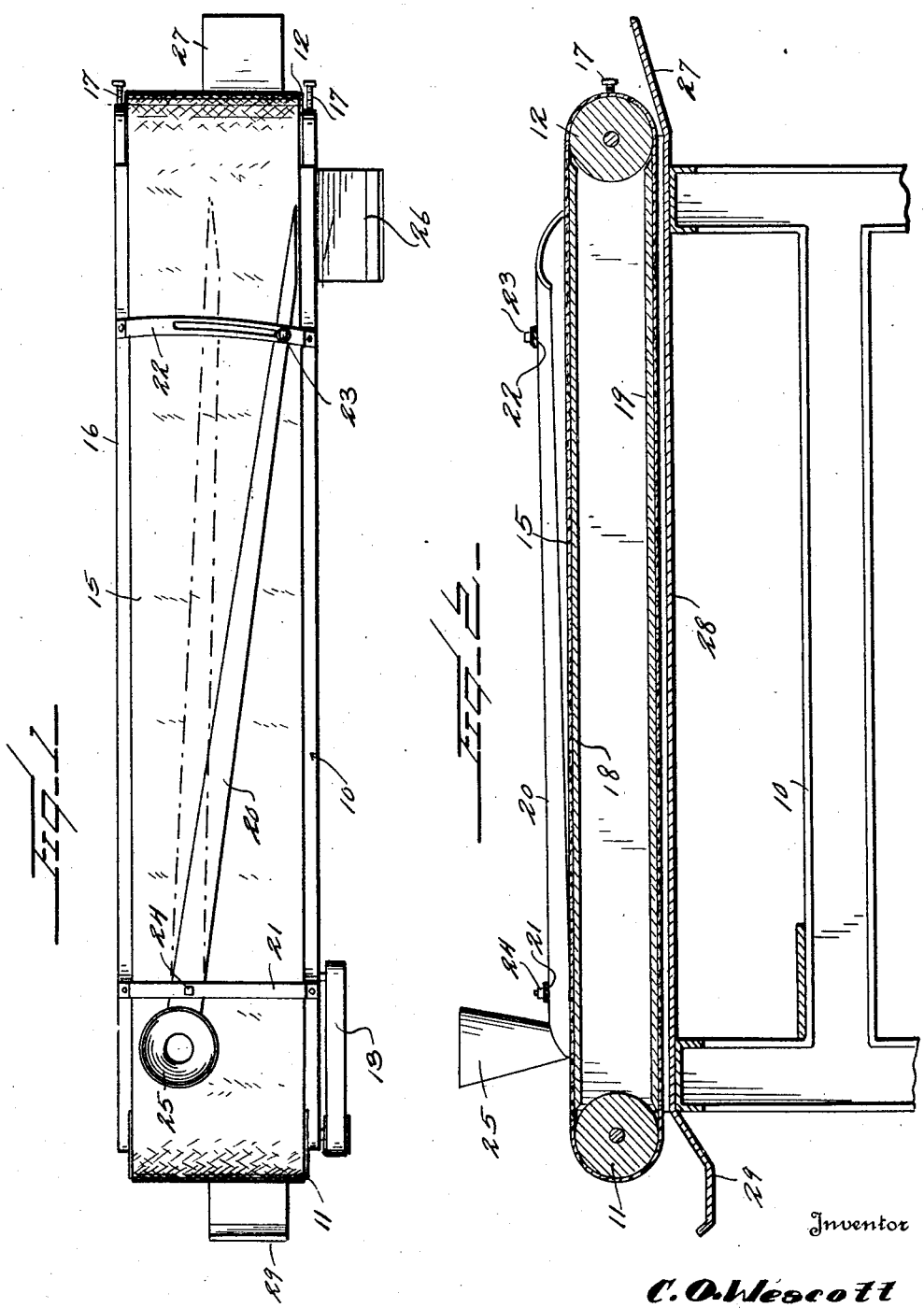
Inventor
C. O. Wescott
By Watson E. Coleman
Attorney Sept. 3, 1929.  C. O. WESCOTT  1,726,969
BUN AND FINGER ROLL MOLDING MACHINE
Filed March 29, 1928  2 Sheets-Sheet 2
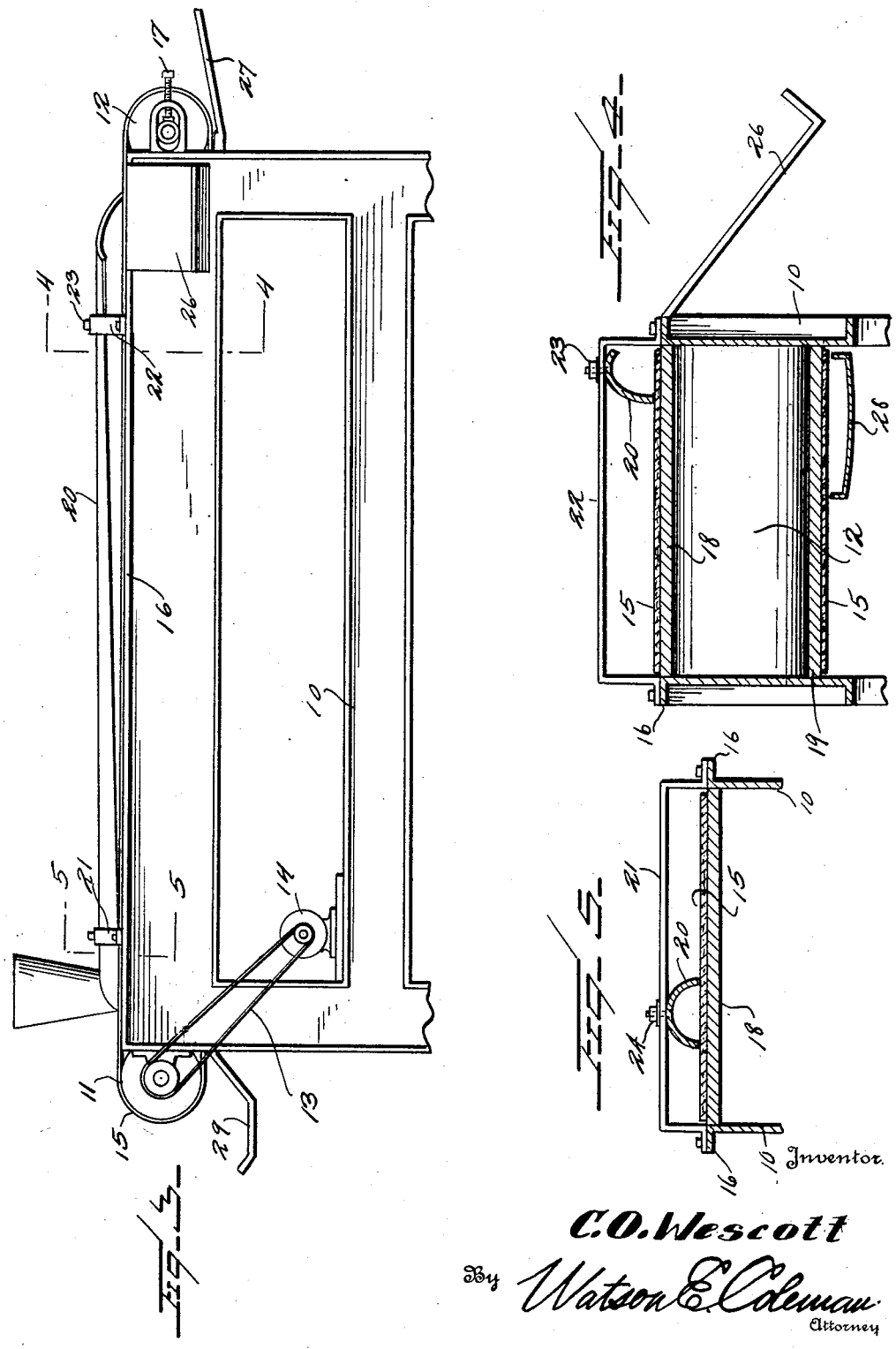

Patented Sept. 3, 1929.

1,726,969

UNITED STATES PATENT OFFICE.

CHARLES OSCAR WESCOTT, OF PORTLAND, OREGON.

BUN AND FINGER-ROLL MOLDING MACHINE.

Application filed March 29, 1928. Serial No. 265,738.

This invention relates to machines for molding dough into various forms, such as finger rolls, buns, "Coney Islands", French rolls or even ordinary loaves of bread, and the general object is to provide a machine which is readily adaptable for any of these purposes and in which an endless belt is provided operating beneath a longitudinally extending mold, the dough being carried along the mold by the endless belt and rolled while beneath the mold so that the dough is eventually discharged in a formed condition.

A further object is to provide a machine of this character which is very simple, which may be easily constructed, readily operated, and which has been found very satisfactory for the purpose desired.

My invention is illustrated in the accompanying drawings, wherein:—

Figure 1 is a top plan of a dough molding machine constructed in accordance with my invention;

Figure 2 is a longitudinal sectional view thereof;

Figure 3 is a side elevation thereof;

Figure 4 is a transverse section on the line 4—4 of Figure 3;

Figure 5 is a section on the line 5—5 of Figure 3.

Referring to these drawings, 10 designates the frame of the machine having the two rollers 11 and 12 mounted at opposite ends of the top of the frame. The roller 11 is the driving roller and driven by a belt 13 to a motor 14 or any other suitable source of power. The endless belt 15 passes over the rollers 11 and 12 and has a width approximately equal to the width of the frame, the frame being provided with the upwardly extending flanges 16 at the sides of the frame. Preferably the roller 12 is provided with means, such as the screw 17, whereby the roller 12 may be shifted away from the roller 11 to thus tighten the belt and hold it in a tight condition.

Disposed beneath the upper flight of the the belt 15 is a belt-supporting board or table 18 against which the upper flight of the belt runs and below the table or board 18 is a second longitudinally extending board 19 which is disposed just above the upper face of the lower flight of the belt and which supports the flight against any inward movement. Disposed above the upper flight of the belt is a transversely concave, metallic mold 20 supported at intervals by transverse braces 21 and 22.

The brace 22 is slotted and a screw 23 is provided engaging the slot and engaging the mold 20. The brace 21 carries a pivot 24 upon which the mold is mounted and the brace 22 may be arcuately curved concentric to this pivot or the mold 20 may be provided with a slot within which the screw 23 is mounted so as to permit this mold 20 to be shifted transversely across the upper face of the upper flight of the belt.

A hopper 25 is carried upon the forward end of the mold 20 and discharges dough into the space between the upper flight of the belt 15 and the mold 20. The mold 20 is transversely curved and overhangs the belt and is disposed at such an angle thereto that the movement of the belt will act to cause the dough to roll against the mold, thereby rolling the dough into rolls or loaves. When the mold is disposed as shown in full lines in Figure 1, the end of the mold discharges into a receptacle 26, and if it be desired to mold buns, ordinary rolls or the like, the dough is placed in the hopper 25 from which it passes into the space between the mold and the upper flight of the belt 15 and the dough travels along this belt and is rolled by contact with the mold so that eventually the dough is formed into an approximately ball-shaped mass which is dropped in the receptacle 26 and from thence may be removed to the baking pans. If it be desired, however, to form finger rolls, the mold is shifted to the position shown in dotted lines in Figure 1. This causes the balls of dough to be discharged from the end of the mold and be carried along by the belt 15 and then discharged over the roller 12 onto a plate 27.

The plate inclines downward and forward and discharges the ball of dough into the space between the lower flight of the belt 15 and the mold 28. This mold 28, as shown in Figure 4, is also transversely concave but is relatively wide and relatively shallow and may have side flanges approximately at right angles to the body of the plate. These side flanges protect contacting with the belt 15. The balls of dough discharge onto the table 27, pass down into the space between this plate and the belt, and are rolled longitudinally along the mold and discharged at the end onto a table 29. By this means the more or less globular balls of dough are molded into the shape of elongated rolls, such as finger rolls and the like.

It will be obvious that the molds 20 and 28 may have other forms than those shown so that a large variety of different kinds of breadstuffs may be molded on this machine.

It is a particularly important feature of my invention that the mold 20 shall be disposed or capable of being disposed at an inclination to the longitudinal axis or line of movement of the belt 15 as under these circumstances, when the dough is received in the guide or hopper 25, from a dividing machine, the dough is moved under pressure against the mold for the entire length of the mold and when it is finally discharged, the dough is in a round compact ball of the desired size. The mold 20 exerts, therefore, a diagonal pressure on the dough and makes a round compressed seamless ball of dough which is particularly necessary and desirable for baking purposes. My mold exerts a continuous pressure on the dough from the time the dough is received until it is discharged.

When the mold is adjusted nearly parallel with the conveyor belt 15, the ball of dough is rolled very loosely and this leaves seams and air pockets in the dough, but by swinging it into diagonal relation to the conveyor, the dough, as before stated, is rolled tightly into a compact mass with no seams or air pockets as before stated.

While I have illustrated a particular form of my invention which has been found in actual practice to be thoroughly effective for the purpose intended, it will be obvious that slight changes might be made in the details of construction and arrangement of parts without departing from the spirit of the invention as defined in the appended claims. Thus, for instance, while I have shown in Figure 4 the mold 28 as having straight, upwardly inclined sides, this mold might have a greater depth or be more concave transversely so that rolls would be formed having pointed ends, such as given to French rolls, which are large in the center and rolled to a sharp point at either end.

I claim:—

1. A bread molding device of the character described including an endless belt, means supporting a flight of the endless belt against inward movement, a transversely concave mold disposed with its concave face confronting the belt, and means for discharging dough into the space between the mold and belt, the mold being shiftable into or out of angular relation to the belt.

2. A dough molding machine comprising a supporting frame, rollers carried at the ends of the frame, an endless belt traveling over said rollers, members disposed between the upper and lower flights of the endless belt and against which the upper and lower flights of the belt move, a longitudinally extending, transversely concave mold disposed above the upper flight of the endless belt with its concave face confronting the belt, the mold being mounted for swinging movement transversely of the belt into or out of angular relation thereto, means for discharging a piece of dough into the space between said mold and the belt at the upper end thereof, a second mold disposed below the lower flight of the belt and extending longitudinally thereof, the mold being transversely concave with its concave side confronting the belt, and means for guiding balls of dough formed by the first named mold around the end of the belt and into the space between the second named mold and the belt.

3. A dough molding machine of the character described comprising a supporting frame, rollers at the ends of the frame, an endless belt mounted upon the rollers, supporting members disposed between the flights of the endless belt and against which the upper and lower flights of the belt move, a transversely concave mold disposed above the upper flight of the belt pivotally supported at one end whereby the mold may be swung to intersect one side of the belt or to discharge onto the belt, the mold having a hopper at its receiving end, a member upon which the mold in the first named position may discharge, a table at the end of the table remote from the receiving end of the mold onto which balls of dough formed by the mold may discharge, a second mold transversely concave and disposed longitudinally of the lower flight of the belt and receiving balls of dough from the table, and a member upon which the dough after being acted upon by the second named mold may be discharged.

In testimony whereof I hereunto affix my signature.

C. O. WESCOTT.